United States Patent [19]

Gessell et al.

[11] 4,167,615

[45] Sep. 11, 1979

[54] HYDROCARBON SOLUBLE CATALYST CONTAINING DINITROGEN OR DIHYDROGEN TRANSITION METAL COMPLEX

[75] Inventors: Donald E. Gessell, Baton Rouge, La.; Kirby Lowery, Jr., Lake Jackson, Tex.

[73] Assignee: The Dow Chemical Company, Midland, Mich.

[21] Appl. No.: 869,545

[22] Filed: Jan. 16, 1978

Related U.S. Application Data

[62] Division of Ser. No. 693,071, Jun. 4, 1976, Pat. No. 4,091,082.

[51] Int. Cl.$^2$ .......................... C08F 4/62; C08F 4/64; C08F 4/68; C08F 4/70
[52] U.S. Cl. .................................. 526/161; 526/159; 526/164; 526/169; 526/169.1; 526/172; 526/352; 526/905; 526/907
[58] Field of Search .............. 526/159, 161, 164, 169, 526/169.1, 172, 905, 907

[56] References Cited

U.S. PATENT DOCUMENTS

| | | | |
|---|---|---|---|
| 2,973,349 | 2/1961 | Werber et al. | 526/172 |
| 3,256,259 | 6/1966 | Seger et al. | 526/907 |
| 3,303,178 | 2/1967 | Krishnamurthy | 526/907 |
| 3,318,860 | 5/1967 | Eichenbaum | 526/907 |
| 4,067,822 | 1/1978 | Gessell et al. | 526/161 |

*Primary Examiner*—Alan Holler
*Attorney, Agent, or Firm*—J. G. Carter

[57] ABSTRACT

Hydrocarbon-soluble compositions useful as the transition metal component in the Ziegler polymerization of α-olefins are provided by reacting molecular nitrogen or hydrogen with a transition metal compound such as titanium trichloride to form a dinitrogen or dihydrogen complex of the transition metal compound.

2 Claims, No Drawings

HYDROCARBON SOLUBLE CATALYST CONTAINING DINITROGEN OR DIHYDROGEN TRANSITION METAL COMPLEX

CROSS-REFERENCE TO RELATED APPLICATION

This is a divisional of application Ser. No. 693,071, filed June 4, 1976, now U.S. Pat. No. 4,091,082.

BACKGROUND OF THE INVENTION

This invention relates to new catalytic dinitrogen and dihydrogen complexes of a transition metal and to a method for preparation of the complexes.

In recent years, dinitrogen complexes of certain transition metal have been prepared by (1) reacting a coordination, complex of the transition metal with molecular nitrogen in the presence of reducing agent, (2) reacting a hydride of transition metal in lower oxidation state with molecular nitrogen or (3) displacing a weaker ligand in a coordination complex of the transition metal with molecular nitrogen. See, for example, Allen, "Developments in Inorganic Models of $N_2$ Fixation", *Bioinorganic Chemistry,* Advances in Chemistry Series, 100, 79(1971) and Allen et al, chemical Reviews, 73, 11(1973). Such complexes have been described as useful in the fixation of nitrogen. See, for example, Van Tamelen, "Fixation of Molecular Nitrogen under Mild Conditions", *Bioinorganic Chemistry,* Advances in Chemistry Series, 100, 95(1971).

Heretofore, however, it has not been recognized that molecular nitrogen or molecular hydrogen will react in the absence of a reducing agent with higher oxidation state transition metal compound containing no coordinate covalent bonds to form a dinitrogen or dihydrogen complex of the transition metal.

SUMMARY OF THE INVENTION

The present invention, in one aspect, is a dinitrogen and/or dihydrogen complex of divalent nickel or a transition metal having an oxidation state greater than two. In the complex, the transition metal is bonded by a coordinate covalent bond to molecular nitrogen and/or molecular hydrogen. For purposes of brevity, the foregoing complex will hereinafter be referred to as "the dinitrogen complex" and will include both the dinitrogen and dihydrogen complexes as well as mixtures of dinitrogen and dihydrogen complexes.

In a second aspect, the invention is a method for preparing the aforementioned complex which comprises reacting molecular nitrogen, molecular hydrogen or a mixture thereof under moderate conditions of pressure and temperature with a transition metal compound containing no coordinate covalent bond. With the exception of the suitable divalent nickel compounds, the transition metal compounds used in the method have an oxidation state greater than two. This reaction is advantageously carried out in the absence of a reducing agent.

In a third aspect, the invention is a process for polymerizing an α-olefin under conditions characteristic of Ziegler polymerization wherein the dinitrogen complex is employed as the transition metal component of a Ziegler catalyst.

In addition to being useful as a polymerization catalyst, the dinitrogen complex of the present invention is also useful as a catalyst for alkylation and hydrogenation reactions and as a catalyst in the fixation of nitrogen.

DETAILED DESCRIPTION OF THE EMBODIMENTS

The dinitrogen complex of the present invention is broadly characterized as a complex comprising a transition metal, anionic groups and molecular nitrogen and/or molecular hydrogen. With the exception of divalent nickel compounds, the transition metal of the complex has an oxidation state or valence greater than two. In all complexes of this invention, the molecular nitrogen or molecular hydrogen forms a coordinate covalent bond with the transition metal. The anionic groups of the complex are preferably halide, most preferably chloride or bromide. The number of anionic groups is sufficient to satisfy the valence charge on the transition metal. Due to the high reactivity and instability of the dinitrogen complexes under conditions required for detailed structural analysis, such complexes are not further characterized as to structure. In preferred dinitrogen complexes, it is believed that the ratio of atoms of the transition metal to molecular nitrogen and/or molecular hydrogen is from about 1:0.3 to about 1:3, more preferably from about 1:1 to about 1:3, most preferably about 1:1, and the atomic ratio of transition metal atoms to anionic groups is from about 1:2 to about 1:4, preferably about 1:3. Such complexes are generally soluble in hydrocarbon solvents and should be maintained under an atmosphere of nitrogen, hydrogen or mixture thereof depending upon whether molecular nitrogen, molecular hydrogen or combination thereof is part of the complex. For example, a complex having molecular nitrogen and no molecular hydrogen is preferably kept under a nitrogen atmosphere.

The dinitrogen complex is prepared by reacting, in the absence of a reducing agent, molecular nitrogen or molecular hydrogen in an inert organic diluent with a transition metal compound, preferably a transition metal halide, which compound contains no coordinate covalent bond.

Exemplary transition metal compounds include, for example, the halides such as the chlorides, bromides, iodides and fluorides, of the transition metals of Groups 4b, 6b, 7b and 8 of Mendeleev's Periodic Table of Elements as set forth in *Handbook of Chemistry and Physcis,* CRC, 48th Edition (1967-1968). Exemplary metals are titanium, chromium, zirconium, tungsten, manganese, molybdenum, ruthenium, rhodium, cobalt, nickel and platinum, with titanium and zirconium being preferred. In the most advantageous embodiments, the transition metal compound is insoluble in hydrocarbon diluents and is rendered soluble by the formation of the dinitrogen complex. Exemplary preferred transition metal compounds are titanium trichloride, zirconium tetrachloride, tungsten hexachloride, molybdenum pentachloride, nickel dichloride, with the halides, particularly the chlorides, of titanium being most preferred.

The reaction to form the complex is advantageously carried out in an inert organic diluent at temperatures in the range from ambient to about 200° C. by pressuring nitrogen or hydrogen gas into a reactor containing the transition metal compound dispersed in the inert diluent. For purposes of this invention, an inert organic diluent is an organic fluid that does not prevent formation of the complex and is non-reactive with the complex once it is formed. Accordingly, liquid hydrocarbon such as the aliphatic and aromatic hydrocarbons are useful diluents with the acyclic aliphatic hydrocarbons being preferred. Examples of suitable inert organic diluents include hexane, isooctane, octane, isononane, nonane, decane, cyclohexane, benzene, 2,2,5-trimethyl hexane and mixtures thereof. Preferred diluents are mixtures of isoparaffins, especially those having 8 to 9 carbon atoms per molecule. Pressures employed in the reaction normally range from about 40 to about 300 psig, preferably from about 60 to about 150 psig, with nitrogen and/or hydrogen gas constituting at least 10 mole percent, preferably from about 50 to 100 mole percent, and especially from about 90 to 100 mole percent of the gas phase in the reaction vessel. Although concentration of transition metal compound dispersed in the inert diluent is not particularly critical, it is generally desirable to employ concentrations in the range from about 0.1 to about 10, preferably from about 1 to 10, weight percent of transition metal compound in the inert diluent.

In cases wherein the transition metal compound is insoluble in the organic diluent, it is desirable to agitate the reaction mixture during the reaction to maintain the insoluble compound dispersed in the diluent. In all cases, sufficient agitation to insure through mixing of the components is a desirable practice since it promotes contact between the molecular nitrogen and/or hydrogen and the transition metal compound.

In an especially preferred method for preparing the dinitrogen complex, a Friedel-Craft catalyst is employed, usually in amounts from about 5 to about 50 weight percent based on the transition metal halide, to accelerate the reaction and to increase yield of dinitrogen complex. Examples of preferred Friedel-Craft catalysts for this purpose are aluminum trichloride and aluminum trifluoride. Other known Friedel-Craft calaysts may be suitably employed.

The time required to form significant amounts of the dinitrogen complex varies with the conditions of the reaction as well as the particular transition metal compound. Generally a reaction time in the range from about 1 to about 8 hours, preferably from 1 to 2 hours, is sufficient when operating under the conditions of temperature and pressure described hereinbefore.

Following the reaction, the hydrocarbon-soluble dinitrogen complex is recovered from the reaction mixture by decanting the supernatant of the reaction mixture from the insoluble transition metal residues and/or by filtering the solid residue and recovering the filtrate.

In the practice of the polymerization process of the present invention, the dinitrogen complex is employed as the transition metal component in an otherwise conventional Ziegler polymerization process. Accordingly, polymerization is effected by adding a catalytic amount of the reaction product of the dinitrogen complex and an organometallic cocatalyst to a polymerization zone containing α-olefin monomer, or vice versa and maintained at temperatures in the range from about 0 to about 300° C., preferably at solution polymerization temperatures, e.g., from about 110° to about 300° C. for a residence time of about 10 minutes to several hours, preferably 15 minutes to 1 hour. It is generally desirable to carry out the polymerization in an inert diluent and in the absence of moisture and oxygen and a catalytic amount of the catalyst composition is generally within the range from about 0.0001 to about 1 milligram-atom of transition metal per liter of diluent. It is understood, however, that the most advantageous catalyst concentration will depend upon polymerization conditions such as temperature, pressure, solvent and presence of catalyst poisons and that the foregoing range is given to obtain maximum catalyst yields. Generally in the polymerization process, a carrier which may be an inert organic diluent or solvent or exess monomer is generally employed. In order to realize the full benefit of the catalyst of the present invention care must be taken to avoid oversaturation of the solvent with polymer. If such saturation occurs before the catalyst becomes depleted, the full efficiency of the catalyst is not realized. For best results, it is preferred that the amount of polymer in the carrier not exceed about 50 weight percent based on the total weight of the reaction mixture.

The organometallic cocatalyst is suitably any reducing component commonly employed in Ziegler polymerization. For example, the cocatalyst may be any organometallic reducing compounds employed in conventional Ziegler polymerization, preferably and alkyl aluminum compound having at least two alkyl groups per aluminum, e.g., aluminum trialkyls or dialkyl aluminum halides. Examples include aluminum triethyl, aluminum triisobutyl, aluminum tripropyl, aluminum trimethyl, diethyl aluminum chloride and others wherein alkyl has from 1 to 12 carbons and halide is preferably chloride or bromide. Preferably, the organometallic reducing compound is present in concentrations sufficient to provide an atomic ratio of reducing metal to transition metal in the range from about 0.3:1 to about 2000:1, preferably from about 1:1 to about 150:1, especially from about 1:1 to about 10:1.

The α-olefins polymerized in this process are aliphatic olefins an others which polymerize under conventional Ziegler polymerization conditions; e.g., ethylne, propylene, 1-butene, 1-pentene, 3-methyl-1-pentene, 1-hexene, etc.

It is understood that inert diluents employed in the polymerization recipe are suitably the diluents used in preparati0n of the complex as hereinbefore.

The polymerization pressures usually employed are relatively low, e.g., from about 100 to about 500 psig. However, polymerization within the scope of the present invention can occur at pressures from atmospheric up to pressures determined by the capabilities of the polymerization equipment. During polymerization it is desirable to stir the polymerization recipe to obtain better temperature control and to maintain uniform polymerization mixtures throughout the polymerization zone.

Hydrogen is often employed in the practice of this invention to lower molecular weight of the resultant polymer. For the purpose of this invention, it is beneficial to employ hydrogen in concentrations ranging from about 0.001 to about 1 mole per mole of monomer. The larger amounts of hydrogen within this range are found to produce generally lower molecular weight polymers. It is understood that hydrogen can be added with a monomer stream to the polymerization vessel or separately added to the vessel before, during or after addition of the monomer to the polymerization vessel, but during or before the addition of the catalyst.

The monomer or mixture of monomers is contacted with the catalyst composition in any conventional mannner, preferably by bringing the catalyst composition and monomer together with intimate agitation provided by suitable stirring or other means. Agitation can be continued during polymerization, or in some instances, the polymerization can be allowed to remain unstirred while polymerization takes place. In the case of more rapid reactions with more active catalysts, means can be provided for refluxing monomer and solvent, if any of the latter is present and thus remove the heat of reaction. In any event, adequate means should be provided for dissipating the exothermic heat of polymerization. If desired, the monomer can be brought in the vapor phase into contact with the catalyst composition, in the presence or absence of liquid material. The polymerization can be effected in the batch manner, or in a continuous manner, such as, for example, by passing the reaction mixture through an elongated reaction tube which is contacted externally with suitable cooling medium to maintain the desired reaction temperature, or by passing the reaction mixture through an equilibrium overflow reactor or a series of the same.

The polymer is recovered by conventional techniques. For example, the reaction mixture may be quenched with alcohol to deactivate catalyst. Subsequently, the polymer product is washed with alcohol or mineral acid for further removal of catalyst residues.

The following examples are given for the purposes of illustrating the present invention and should not be construed as limiting its scope. In the following examples, all parts and percentages are by weight unless otherwise indicated.

EXAMPLE 1

Preparation of Dinitrogen Complex

In liter, stainless steel reactor, a 15-g portion of $\Delta TiCL_3 \cdot \frac{1}{3} ALCL_3$ is mixed with 200 mL of Isopar E ® (a mixture of saturated isoparaffins having 8 or 9 carbon atoms) and refluxed at 120° C. for two hours in a nitrogen atmosphere at atmospheric pressure. The delta titanium chloride activated with aluminum chloride ($\Delta TiCL_3 \cdot \frac{1}{3} ALCL_3$) is prepared by reducing $TiCl_4$ with metallic aluminum. The Isopar E ® is purged with nitrogen to remove oxygen and then dried with molecular sieves.

The reaction mixture is decanted and filtered to remove solid residue including unreacted $\Delta TICL_3 \cdot \frac{1}{3} ALCL_3$. Analysis by emission spectroscopy of the resulting filtrate for titanium and aluminum indicates 150 ppm Ti and less than 5 ppm Al. The filtered solid residue is added to another 200-ml portion of Isopar E ® and the foregoing procedure is repeated. The resultant filtrate contains 100 ppm Ti and less than 5 ppm Al. Analysis of the foregoing filtrates for nitrogen by Kjeldahl method and infrared spectroscopy indicates presence of nitrogen as Ti—N≡N (II bonded) in concentration of 2000 ppm.

Polymerization

Into a 4-oz serum bottle is added a dilute solution of aluminum triethyl and the aforementioned solution of the dinitrogen complex. The temperature of the serum bottle is maintained at ambient temperature and the reaction is observed to be complete after 5 minutes.

Following the procedure of a conventional Ziegler polymerization, ethylene is polymerized in a paraffin diluent in the presence of hydrogen and the aforementioned catalyst. The temperature is controlled at 150° C. and ethylene pressure is maintained constant at approximately 120 psig. Polyethylene is recovered from the reaction mixture in a conventional manner.

Comparative Showing

For purposes of comparison, the foregoing procedure is followed except that an argon atmosphere is substituted for the nitrogen while refluxing the $\Delta TiCl_3 \cdot \frac{1}{3} ALCL_3$ in Isopar E ®. The resulting filtrate is essentially colorless and contains 11 ppm of Ti and <5 ppm of Al. Analysis of this filtrate indicates Ti is present as $TiCl_4$. Repetition of foregoing process three times under argon atmosphere yields three filtrates, each containing <15 ppm of Ti and <5 ppm of Al. None of these four filtrates made under argon when combined with aluminum triethyl in the foregoing manner catalyzes the polymerization of ethylene.

As evidenced by the foregoing data of this example, the presence of molecular nitrogen during the preparation of the transition metal component of the catalyst yields the desired hydrocarbon soluble titanium complex which when combined with a suitable organo-metallic reducing component catalyzes the polymerization of ethylene.

EXAMPLE 2

Following the general procedure of Example 1, a 5-g portion of $\Delta TiCl_3 \cdot \frac{1}{3} AlCl_3$ is mixed with 200 ml of Isopar E ® and heated at 120° C. for 2 hours under 100 psig of nitrogen gas.

The reaction mixture is filtered yielding a black filtrate containing 4000 ppm Ti, 110 ppm Al and 1.01 percent chloride. Analysis for nitrogen indicates an $N_2$ concentration of 2000 ppm which is bonded through a $\pi$-bond to titanium. The black filtrate catalyzes the polymerization of ethylene when employed in combination with trialkyl aluminum and subjected to polymerization conditions of Example 1.

EXAMPLE 3

Following the procedure of Example 2, a 2-g portion of $TiCl_3$ which has been washed with Isopar E ® to remove residual $TiCl_4$ is mixed with 200 ml of Isopar E ® and heated under a nitrogen atmosphere.

The reaction mixture is filtered and the resultant filtrate contains 320 ppm Ti (III) and <5 ppm aluminum. A combination of the filtrate and aluminum triethyl catalyzes the polymerization of ethylene.

EXAMPLE 4

Following the procedure of Example 3, a 2-g portion of tungsten hexachloride is mixed with 200 ml of Isopar E ® and heated under a nitrogen atmosphere. The filtrate from the reaction mixture contains 260 ppm tungsten s W(VI) in the form of a dinitrogen complex. A combination of the filtrate and aluminum triethyl catalyzes the polymerization of ethylene.

EXAMPLE 5

Following the general procedure of Example 1, a 3-g portion of zirconium tetrachloride and 1-g of $AlCl_3$ is mixed with 400 ml of Isopar E ® and refluxed at 120° C. for 4 hours under an atmosphere of nitrogen. A brown oil is formed at the bottom of the reactor. The remaining supernatant liquid (300 ml) is decanted and is found to contain 400 ppm of Zr (IV) and less than 5 ppm of aluminum. Analysis of the supernatant indicates a dinitrogen complex of zirconium. A combination of supernatant and aluminum triethyl catalyzes the polymerization of ethylene.

EXAMPLE 6

A 2-g portion of $\Delta TiCl_3 \cdot \frac{1}{3} AlCl_3$ as employed in Example 1 is slurried with 200 ml of Isopar E ® in a liter stainless steel reactor under a dry nitrogen atmosphere. The reactor was pressured to 100 psig with hydrogen (instead of N$_2$) and subsequently stirred for 2 hours at 120° C. The reactor is cooled, contents allowed to settle, and the supernatant is removed with a syringe. Analysis of the supernatant by emission spectroscopy indicates 1700 ppm Ti. A combination of the filtrate and aluminum triethyl catalyzes the polymerization of ethylene.

What is claimed is:

1. In a Ziegler polymerization process which involves contacting an α-olefin with a catalytic amount of a catalyst comprising a transition metal component and an organometallic reducing compound under conditions sufficient to polymerize the α-olefin, the process wherein the transistion metal component is a hydrocarbon-soluble complex of a transition metal comprising a transition metal of Groups 4b, 6b, 7b and 8 of Mendeleev's Periodic Table of Elements having a valence greater than two or divalent nickel, a number of halide anionic groups sufficient to satisfy the valence charge on the transition metal, and molecular nitrogen and/or molecular hydrogen bonded to the transition metal through a coordinate covalent bond.

2. The process of claim 1 wherein an alkyl aluminum compound having at least two alkyl groups per aluminum is employed as the organometallic compound, the anionic halide group is chloride, the transition metal is titanium which is bonded only to a molecular nitrogen through a coordinate covalent bond.

* * * * *